(12) United States Patent
Wang et al.

(10) Patent No.: US 7,825,048 B2
(45) Date of Patent: Nov. 2, 2010

(54) PUNCTURE RESISTANT COMPOSITE

(75) Inventors: Yunzhang Wang, Duncan, SC (US); Thomas E. Mabe, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 1064 days.

(21) Appl. No.: 11/538,582

(22) Filed: Oct. 4, 2006

(65) Prior Publication Data
US 2007/0105471 A1 May 10, 2007

Related U.S. Application Data

(60) Provisional application No. 60/727,486, filed on Oct. 17, 2005.

(51) Int. Cl.
B32B 27/04 (2006.01)
(52) U.S. Cl. ............................................. 442/135; 2/2.5
(58) Field of Classification Search ...................... 2/2.5; 89/36.01, 36.02, 36.05; 428/911, 912; 442/134, 442/135
See application file for complete search history.

(56) References Cited

U.S. PATENT DOCUMENTS

| | | | |
|---|---|---|---|
| 1,213,118 A | 1/1917 | Lynch | |
| 3,563,836 A | 2/1971 | Dunbar | |
| 3,601,923 A | 8/1971 | Rosenberg | |
| 4,186,648 A | 2/1980 | Clausen et al. | |
| 4,292,882 A | 10/1981 | Clausen | |
| 4,425,080 A | 1/1984 | Stanton et al. | |
| 4,623,574 A | 11/1986 | Harpell et al. | |
| 4,690,825 A | 9/1987 | Won | |
| 4,879,165 A | 11/1989 | Smith | |
| 4,961,685 A | 10/1990 | Neubert | |
| 4,969,386 A | 11/1990 | Sandstrom et al. | |
| 5,011,183 A | 4/1991 | Thornton et al. | |

(Continued)

FOREIGN PATENT DOCUMENTS

GB 1 577 012 10/1973

(Continued)

OTHER PUBLICATIONS

Degussa AG, *AEROSIL®: Dispersions* (2004).

(Continued)

*Primary Examiner*—Arti Singh-Pandey
(74) *Attorney, Agent, or Firm*—Cheryl J. Brickey

(57) ABSTRACT

A puncture resistant composite comprises a first textile layer and a second textile layer, each of which comprises a plurality of yarns or fibers having a tenacity of about 8 or more grams per denier. The layers are stacked so that the upper surface of the second textile layer is adjacent to the lower surface of the first textile layer. At least one of the lower surface of the first textile layer and the upper surface of the second textile layer comprises about 10 wt. % or less, based on the total weight of the textile layer, of a coating comprising a plurality of particles having a diameter of about 20 μm or less. The coating can also comprise a binder. The composite can also be used in combination with other puncture resistant and/or ballistic resistant materials or components. A process for producing a puncture resistant composite is also provided.

20 Claims, 5 Drawing Sheets

U.S. PATENT DOCUMENTS

| | | |
|---|---|---|
| 5,035,111 A | 7/1991 | Hogenboom et al. |
| 5,045,371 A | 9/1991 | Calkins |
| 5,110,661 A | 5/1992 | Groves |
| 5,145,675 A | 9/1992 | Won |
| 5,225,241 A | 7/1993 | Dischler |
| 5,275,873 A | 1/1994 | Chitrangad |
| 5,322,721 A | 6/1994 | McGinnis, Jr. et al. |
| 5,402,703 A | 4/1995 | Drotleff |
| 5,466,503 A | 11/1995 | Dischler |
| 5,533,755 A | 7/1996 | Nelsen et al. |
| 5,569,509 A | 10/1996 | Dischler |
| 5,580,629 A | 12/1996 | Dischler |
| 5,589,254 A | 12/1996 | Dischler |
| 5,595,809 A | 1/1997 | Dischler |
| 5,776,839 A | 7/1998 | Dischler et al. |
| 5,880,042 A | 3/1999 | Schuster et al. |
| 6,248,676 B1 | 6/2001 | Dischler |
| 6,475,936 B1 | 11/2002 | Chiou |
| 6,543,055 B2 | 4/2003 | Howland et al. |
| 6,656,570 B1 | 12/2003 | Fels et al. |
| 6,737,368 B2 | 5/2004 | Chiou |
| 6,846,548 B2 | 1/2005 | Harpell et al. |
| 6,893,989 B2 | 5/2005 | Breukers |
| 7,642,206 B1 * | 1/2010 | Bhatnagar et al. ............ 442/135 |
| 2002/0106957 A1 | 8/2002 | Ritter |
| 2004/0048109 A1 | 3/2004 | Granqvist et al. ............ 428/911 |
| 2004/0048538 A1 | 3/2004 | Granqvist et al. ............ 442/181 |
| 2005/0266748 A1 | 12/2005 | Wagner et al. |

FOREIGN PATENT DOCUMENTS

| | | |
|---|---|---|
| GB | 2 242 193 A | 9/1991 |
| WO | WO 2006/121411 A1 | 11/2006 |

OTHER PUBLICATIONS

Degussa AG, *AERODISP®: The Trusted Value of AEROSIL® in a Convenient Form* (2004)

* cited by examiner

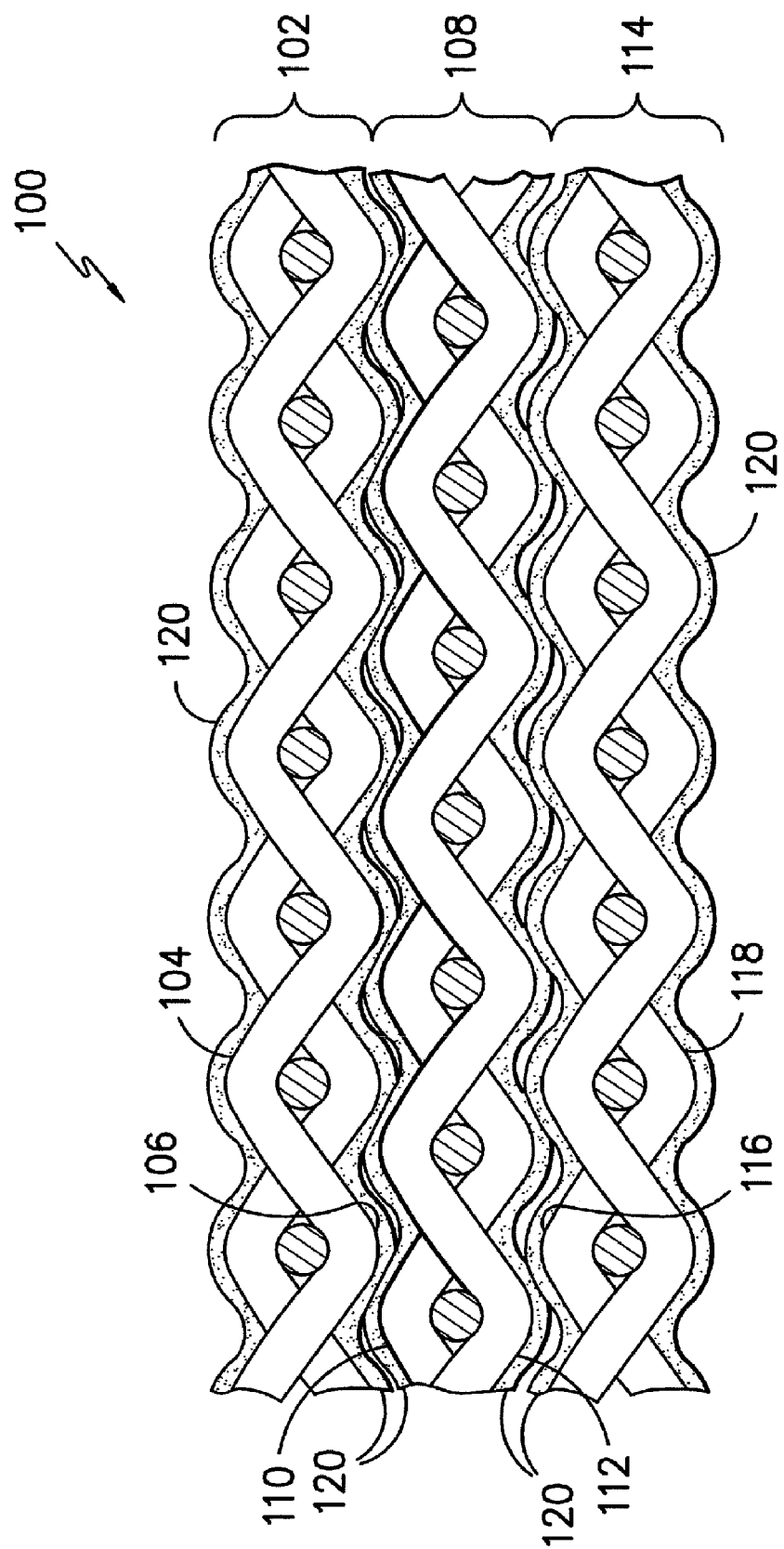
FIG. -1-

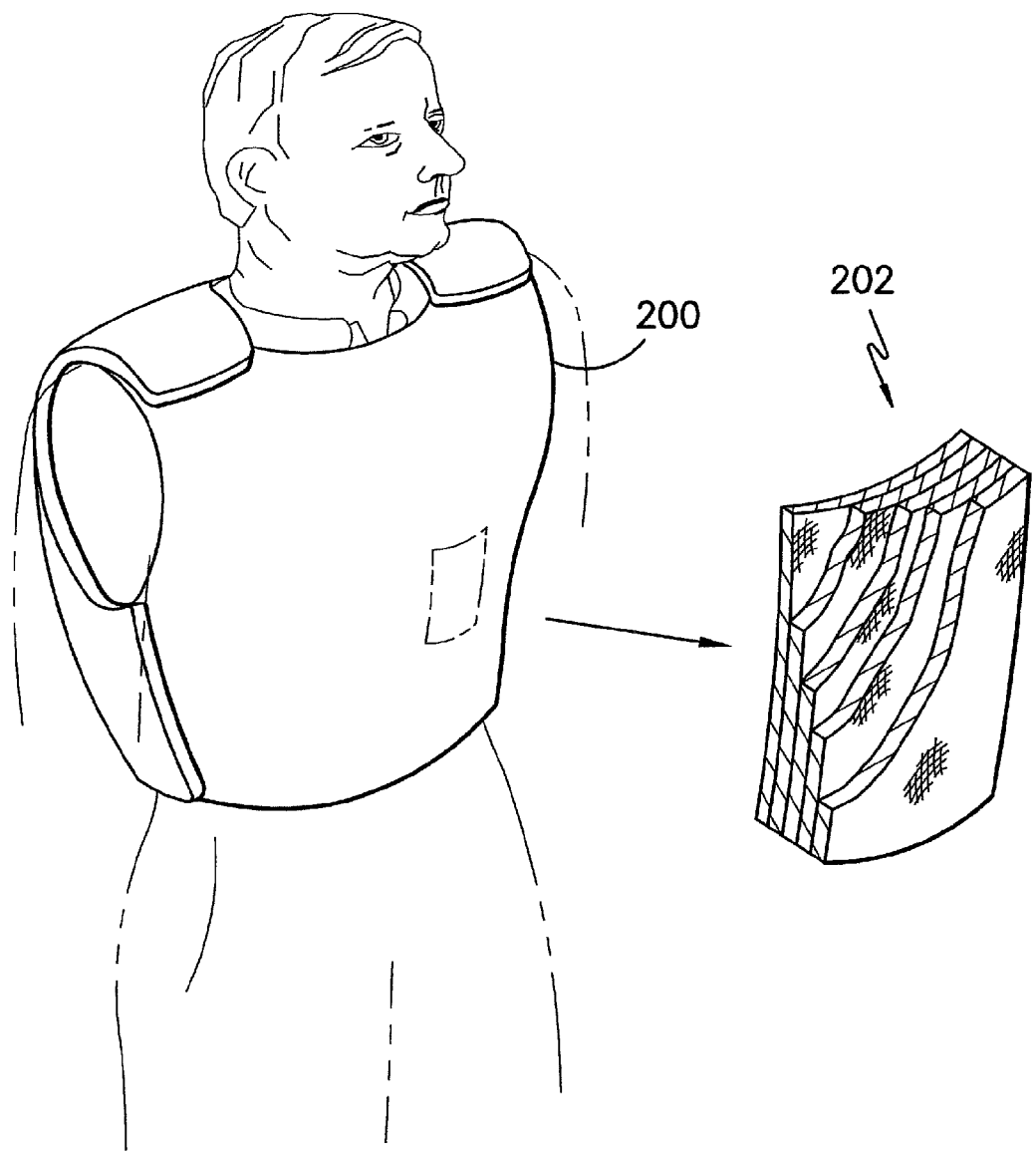
FIG. —2—

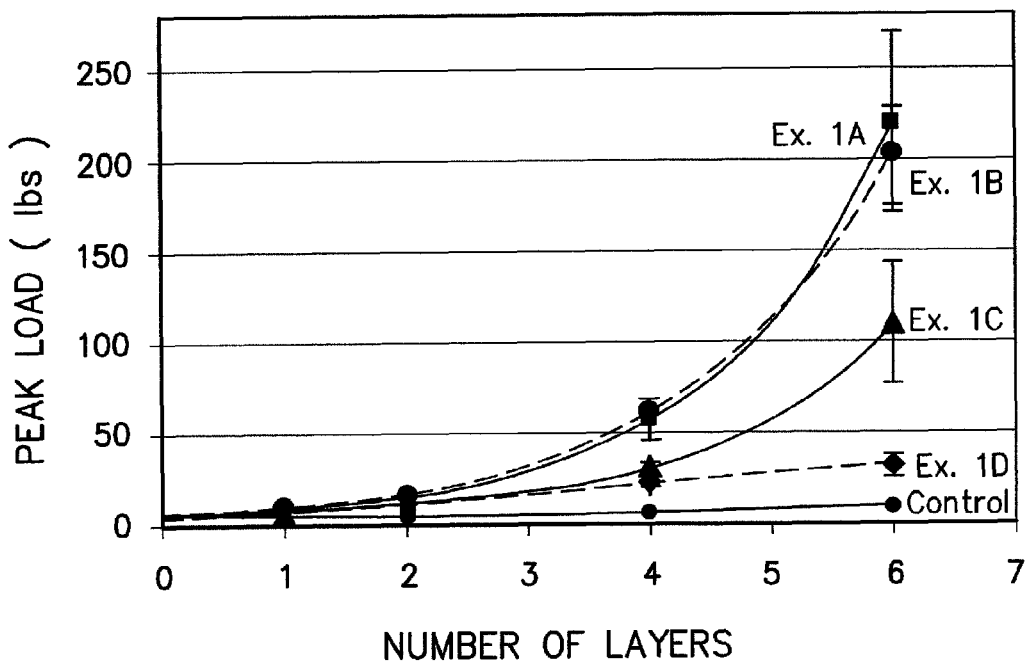
FIG. -3-
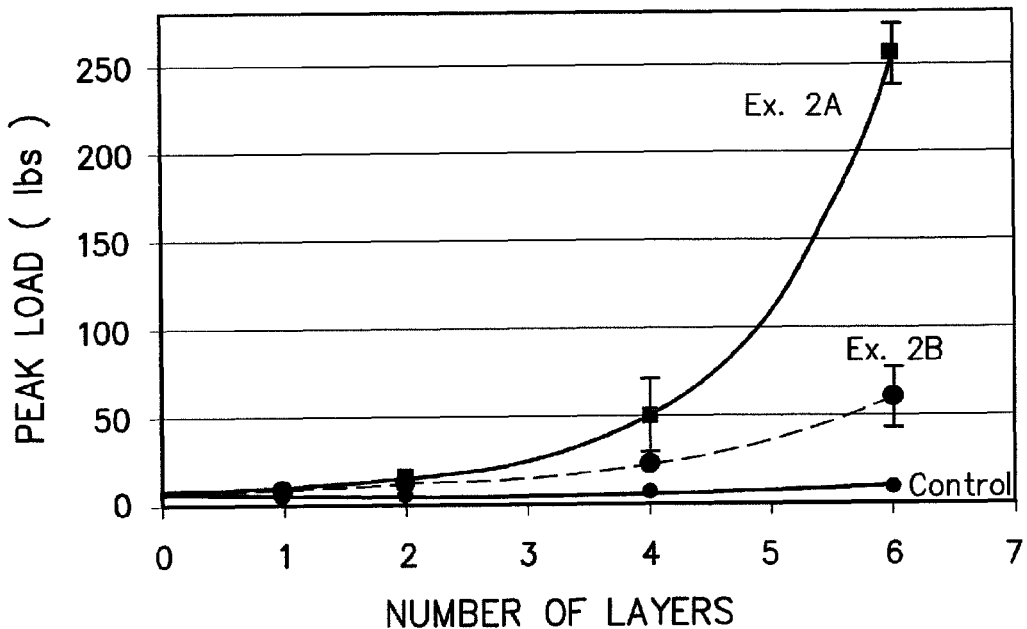
FIG. -4-

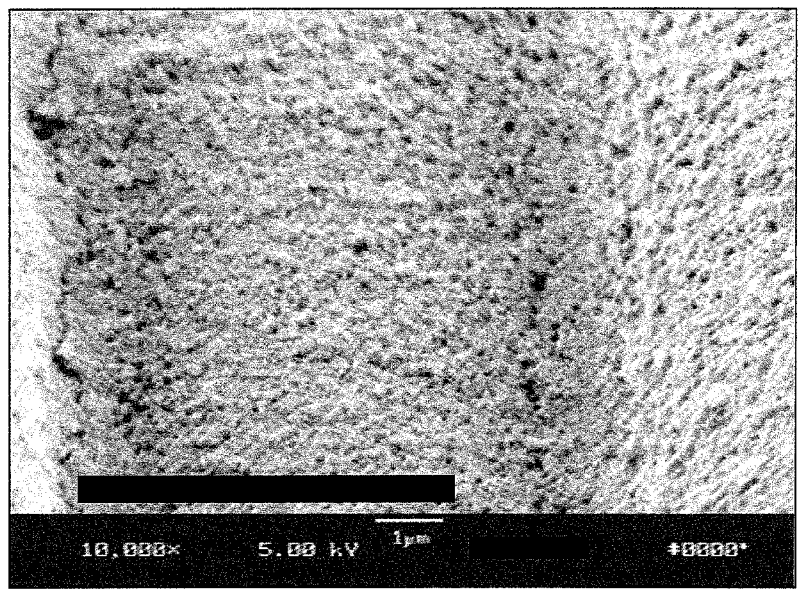
FIG. -5-
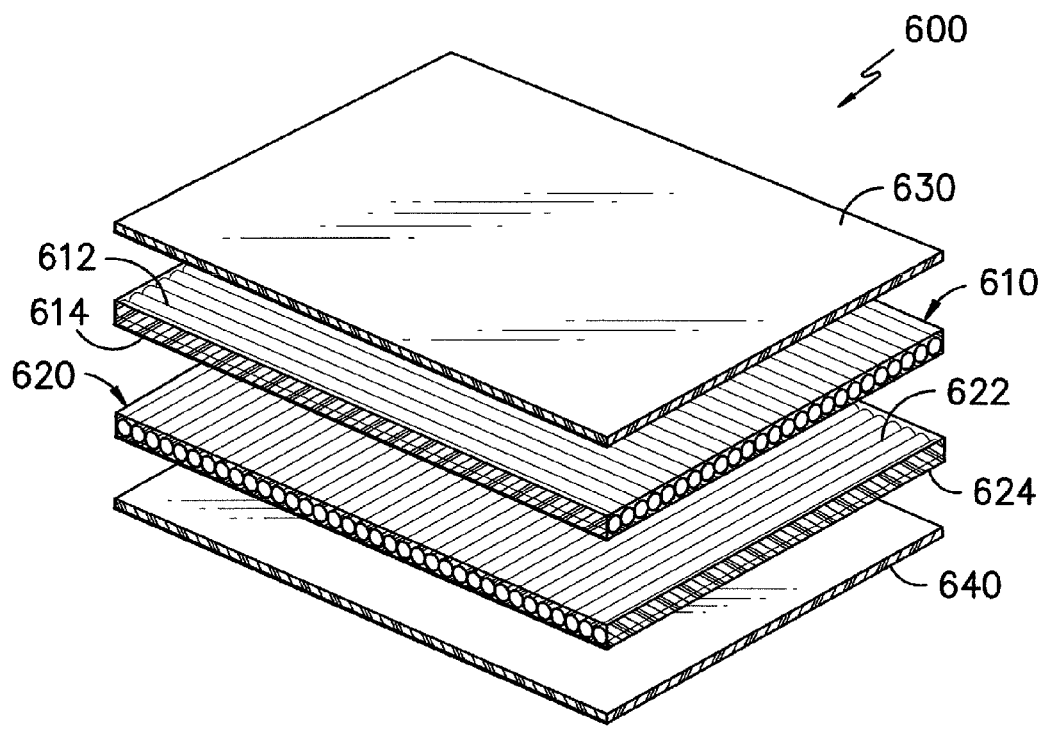
FIG. -6-
PRIOR ART

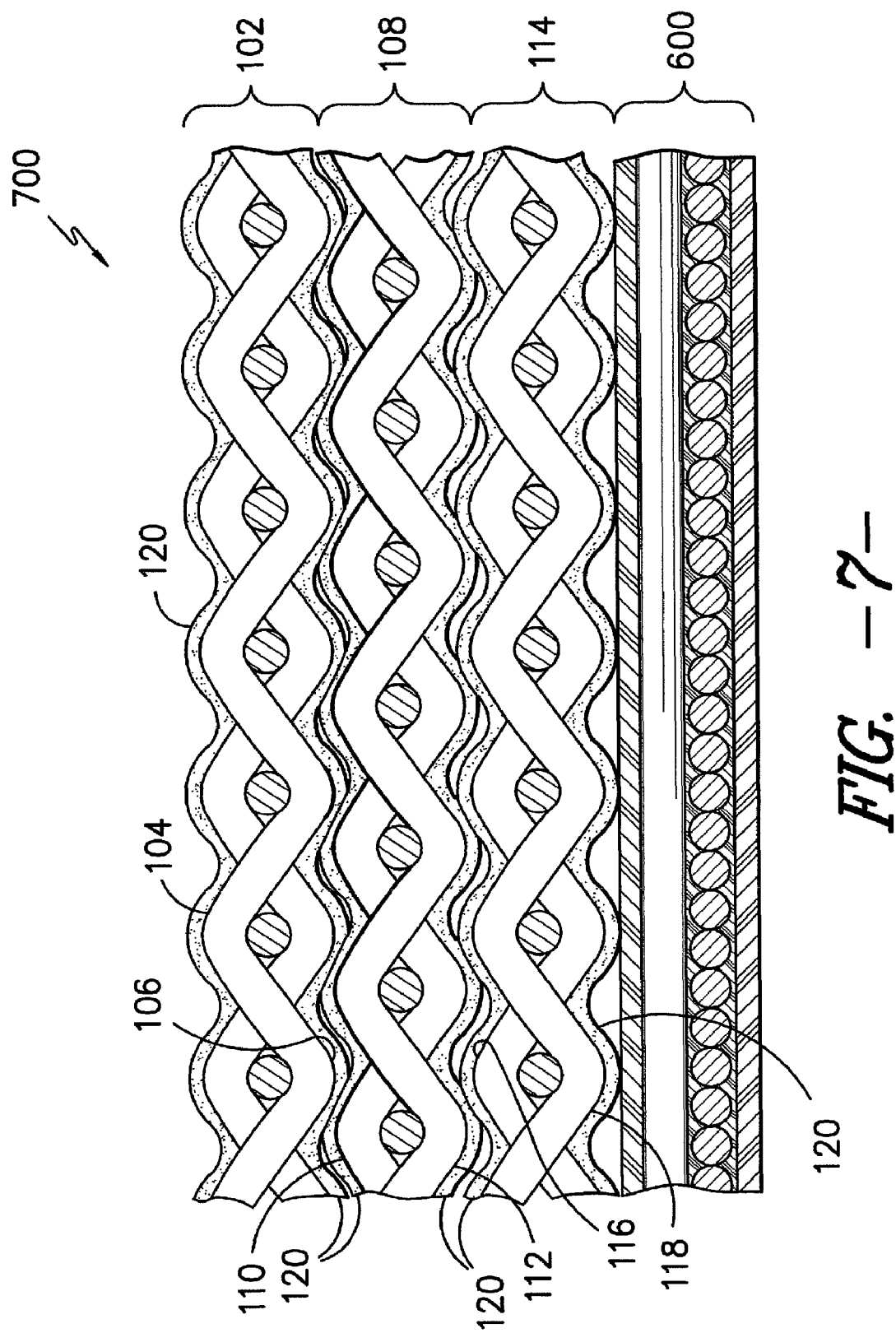
FIG. -7-

PUNCTURE RESISTANT COMPOSITE

CROSS-REFERENCE TO RELATED PATENT APPLICATIONS

This application claims, under 35 U.S.C. §119(e), the benefit of the filing date of copending, provisional U.S. Patent Application No. 60/727,486, which was filed on Oct. 17, 2005.

FIELD OF THE INVENTION

The present application is directed to composites exhibiting puncture resistant properties.

BRIEF SUMMARY OF THE INVENTION

The invention provides a puncture resistant composite comprising (a) a first textile layer comprising a plurality of yarns or fibers having a tenacity of about 8 or more grams per denier, the first textile layer having an upper surface and a lower surface, (b) a second textile layer comprising a plurality of yarns or fibers having a tenacity of about 8 or more grams per denier, the second textile layer having an upper surface and a lower surface, the upper surface of the second textile layer being adjacent to the lower surface of the first textile layer, wherein at least one of the lower surface of the first textile layer and the upper surface of the second textile layer comprises about 10 wt. % or less, based on the total weight of the textile layer, of a coating comprising a plurality of particles having a diameter of about 20 μm or less. The puncture resistant composite according to the invention can further comprise ballistic resistant materials (e.g., ballistic resistant laminates) and/or puncture resistant materials (e.g., chain mail, metal plating, or ceramic plating).

The invention also provides a process for producing a puncture resistant composite, the process comprising the steps of (a) providing a first textile layer and a second textile layer, the first and second textile layers each comprising a plurality of yarns or fibers having a tenacity of about 8 or more grams per denier, and the first and second textile layers each having an upper surface and a lower surface, (b) contacting at least one of the lower surface of the first textile layer and the upper surface of the second textile layer with a coating composition comprising a plurality of particles having a diameter of about 20 μm or less, (c) drying the textile layer treated in step (b) to produce a coating on the lower surface of the first textile layer or the upper surface of the second textile layer, and (d) assembling the first and second textile layers so that the lower surface of the first textile layer is adjacent to the upper surface of the second textile layer, thereby producing a puncture resistant composite.

BRIEF DESCRIPTION OF THE DRAWINGS

FIG. 1 is a sectional view of a puncture resistant composite according to the invention.

FIG. 2 is a perspective view of a personal protection device, specifically a vest, incorporating the puncture resistant composite of the invention.

FIG. 3 is a graph depicting the peak load versus the number of layers for Samples 1A-1D and an untreated control.

FIG. 4 is a graph depicting the peak load versus the number of layers for Sample 2A, Sample 2B and an untreated control.

FIG. 5 is scanning electron micrograph of the surface of Sample 1B.

FIG. 6 is an exploded, perspective view of a ballistic resistant laminate suitable for use in the composite of the invention.

FIG. 7 is a sectional view of a puncture resistant composite according to the invention, which includes a ballistic resistant laminate such as that depicted in FIG. 6.

DETAILED DESCRIPTION OF THE INVENTION

The invention is directed to a puncture resistant composite. As utilized herein, the term "puncture resistant" is generally used to refer to a material that provides protection against penetration of the material by, for example, knives, edged weapons, and sharp-pointed weapons or objects. Thus, a "puncture resistant" material can either prevent penetration of the material by such an object or can lessen the degree of penetration of such an object as compared to similar, non-puncture resistant materials. Preferably, a "puncture resistant" material achieves a pass rating when tested against Level 1, Spike class threats in accordance with National Institute of Justice (NIJ) Standard 0115.00 (2000), entitled "Stab Resistance of Personal Body Armor." The term "puncture resistant" can also refer to materials (e.g., a composite according to the invention) achieving a pass rating when tested against higher level threats (e.g., Level 2 or Level 3) and/or other threat weapons (e.g., Level 1 or higher P1 knife threats and/or Level 1 or higher S1 knife threats) according to NIJ Standard 0115.00. In certain possibly preferred embodiments, the invention can also be directed to a puncture and ballistic resistant composite. As utilized herein, the term "ballistic resistant" generally refers to a material that is resistant to penetration by ballistic projectiles. Thus, a "ballistic resistant" material can either prevent penetration of the material by a ballistic projectile or can lessen the degree of penetration of such ballistic projectiles as compared to similar, non-ballistic resistant materials. Preferably, a "ballistic resistant" material provides protection equivalent to Type I body armor when such material is tested in accordance with National Institute of Justice (NIJ) Standard 0101.04 (2000), entitled "Ballistic Resistance of Personal Body Armor." The term "ballistic resistant" also refers to a material that achieves a pass rating when tested against Level 1 or higher (e.g., Level 2A, Level 2, Level 3A, or Level 3 or higher) ballistic threats in accordance with NIJ Standard 0101.04.

As noted above, the composite of the invention comprises a first textile layer and a second textile layer. The first and second textile layers can have any suitable construction. For example, the first and second textile layers can comprise a plurality of yarns provided in a knit or woven construction. Alternatively, the first and second textile layers can comprise a plurality of fibers provided in a suitable nonwoven construction (e.g., a needle-punched nonwoven, an air-laid nonwoven, etc.). As will be understood by those of ordinary skill in the art, the textile layers of the composite can be independently provided in each of the aforementioned suitable constructions. For example, the first textile layer can comprise a plurality of yarns provided in a woven construction, and the second textile layer can comprise a plurality of fibers provided in a needle-punched nonwoven construction. In certain possibly preferred embodiments, the first and second textile layers comprise a plurality of yarns provided in a woven construction. The first and second textile layers can have any suitable weight. In certain possibly preferred embodiments, the textile layers can have a weight of about 4 to about 10 ounces per square yard.

The yarns or fibers of the first and second textile layers can comprise any suitable fibers. Yarns or fibers suitable for use in the textile layer generally include, but are not limited to, high tenacity yarns or fibers, which refers to yarns that exhibit a relatively high ratio of stress to strain when placed under tension. In order to provide adequate protection against ballistic projectiles, the yarns or fibers of the textile layers typically have a tenacity of about 8 or more grams per denier. In certain possibly preferred embodiments, the yarns or fibers of the first and second textile layers can have a tenacity of about 14 or more grams per denier.

Fibers suitable for use in the first and second textile layers include, but are not limited to, fibers made from highly oriented polymers, such as gel-spun ultrahigh molecular weight polyethylene fibers (e.g., SPECTRA® fibers from Honeywell Advanced Fibers of Morristown, N.J. and DYNEMA® fibers from DSM High Performance Fibers Co. of the Netherlands), melt-spun polyethylene fibers (e.g., CERTRAN® fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kans.), and sintered polyethylene fibers (e.g., TENSYLON® fibers from ITS of Charlotte, N.C.). Suitable fibers also include those made from rigid-rod polymers, such as lyotropic rigid-rod polymers, heterocyclic rigid-rod polymers, and thermotropic liquid-crystalline polymers. Suitable fibers made from lyotropic rigid-rod polymers include aramid fibers, such as poly(p-phenyleneterephthalamide) fibers (e.g., KEVLAR® fibers from DuPont of Wilmington, Del. and TWARON® fibers from Teijin of Japan) and fibers made from a 1:1 copolyterephthalamide of 3,4'-diaminodiphenylether and p-phenylenediamine (e.g., TECHNORA® fibers from Teijin of Japan). Suitable fibers made from heterocyclic rigid-rod polymers, such as p-phenylene heterocyclics, include poly(p-phenylene-2,6-benzobisoxazole) fibers (PBO fibers) (e.g., ZYLON® fibers from Toyobo of Japan), poly(p-phenylene-2,6-benzobisthiazole) fibers (PBZT fibers), and poly[2,6-diimidazo[4,5-b:4',5'-e]pyridinylene-1,4-(2,5-dihydroxy)phenylene] fibers (PIPD fibers) (e.g., M5® fibers from DuPont of Wilimington, Del.). Suitable fibers made from thermotropic liquid-crystalline polymers include poly(6-hydroxy-2-napthoic acid-co-4-hydroxybenzoic acid) fibers (e.g., VECTRAN® fibers from Celanese of Charlotte, N.C.). Suitable fibers also include carbon fibers, such as those made from the high temperature pyrolysis of rayon, polyacrylonitrile (e.g., OPF® fibers from Dow of Midland, Mich.), and mesomorphic hydrocarbon tar (e.g., THORNEL® fibers from Cytec of Greenville, S.C.). In certain possibly preferred embodiments, the yarns or fibers of the textile layers comprise fibers selected from the group consisting of gel-spun ultrahigh molecular weight polyethylene fibers, melt-spun polyethylene fibers, melt-spun nylon fibers, melt-spun polyester fibers, sintered polyethylene fibers, aramid fibers, PBO fibers, PBZT fibers, PIPD fibers, poly(6-hydroxy-2-napthoic acid-co-4-hydroxybenzoic acid) fibers, carbon fibers, and combinations thereof.

The yarns or fibers of the textile layers can have any suitable weight per unit length (e.g., denier). Typically, the yarns or fibers have a weight per unit length of about 50 to about 5,000 denier. In certain possibly preferred embodiments, the yarns or fibers have a weight per unit length of about 100 to about 1,500 denier.

As depicted in FIG. 1, the first and second textile layers are stacked to form the puncture resistant composite 100. The first textile layer 102 has an upper surface 104 and a lower surface 106, and the second textile layer 108 has an upper surface 110 and a lower surface 112. As will be understood by those of ordinary skill in the art, the surfaces of the textile materials have been labeled for reference purposes only, and the designation of one surface as an upper surface and another surface as a lower surface is not intended to indicate the orientation of the technical face or technical back of the textile layer. As noted above, the first and second textile layers are stacked so that, for example, the lower surface of the first textile layer is adjacent to the upper surface of the second textile layer. As depicted in FIG. 1, the puncture resistant composite can comprise, in certain embodiments, a third textile layer 114. The third textile layer 114 can be positioned either above the first textile layer 102 or below the second textile layer 103. In FIG. 1, the third textile layer 114 has an upper surface 116 and a lower surface 118, and the third textile layer 114 is positioned so that the upper surface 116 of the third textile layer 114 is adjacent to the lower surface 112 of the second textile layer 108.

While the composite has been depicted in FIG. 1 as including three textile layers, those of ordinary skill in the art will readily appreciate that the composite can comprise any suitable number of textile layers. For example, the puncture resistant composite can comprise four textile layers, six textile layers, eight textile layers, twelve textile layers, sixteen textile layers, twenty textile layers, thirty textile layers, or forty textile layers.

In order to impart puncture resistance to the composite, at least one of the textile layers comprises a coating on a surface thereof. Typically, the coating is applied to a surface of the textile layer that is adjacent to another textile layer. Thus, as depicted in FIG. 1, the coating 120 can be applied to the lower surface 106 of the first textile layer 102. The coating 120 can also be applied to the upper surface 110 of the second textile layer 108. While not wishing to be bound to any particular theory, it is believed that coating both of the adjacent surfaces of the textile layers will increase the puncture resistance of the resulting composite. In embodiments comprising more than two textile layers, such as that depicted in FIG. 1, the coating 120 can be applied to the lower surface 112 of the second textile layer 108 and the upper surface 116 of the third layer 114. As will be understood by those of ordinary skill in the art, the coating can also be applied to those surfaces of the textile layers which are not adjacent to a surface of another textile layer. For example, as shown in FIG. 1, the coating 120 can be applied to the upper surface 104 of the first textile layer 102 and the lower surface 118 of the third textile layer 114. Moreover, in certain possibly preferred embodiments, the coating can also penetrate into the interior portion of the textile layer (s) to at least partially coat the yarns or fibers of the textile layer.

The coating applied to the textile layer(s) comprises particulate matter (e.g., a plurality of particles). The particles included in the coating can be any suitable particles, but preferably are particles having a diameter of about 20 µm or less, or about 10 µm or less, or about 1 µm or less (e.g., about 500 nm or less or about 300 nm or less). Particles suitable for use in the coating include, but are not limited to, silica particles, (e.g., fumed silica particles, precipitated silica particles, alumina-modified colloidal silica particles, etc.), alumina particles (e.g. fumed alumina particles), and combinations thereof. In certain possibly preferred embodiments, the particles are comprised of at least one material selected from the group consisting of fumed silica, precipitated silica, fumed alumina, alumina modified silica, zirconia, titania, silicon carbide, titanium carbide, tungsten carbide, titanium nitride, silicon nitride, and the like, and combinations thereof. Such particles can also be surface modified, for instance by grafting, to change surface properties such as charge and hydrophobicity. Suitable commercially available particles include, but are not limited to, the following: CAB-O-SPERSE® PG003 fumed alumina, which is a 40% by weight solids aqueous dispersion of fumed alumina available commercially from Cabot Corporation of Boyertown, Pa. (the dispersion has a pH of 4.2 and a median average aggregate particle size of about 150 nm); SPECTRAL™ 51 fumed alumina, which is a fumed alumina powder available commercially from Cabot Corporation of Boyertown, Pa. (the powder has a BET surface area of 55 $m^2/g$ and a median average aggregate particle size of about 150 nm); CAB-O-SPERSE® PG008 fumed alumina, which is a 40% by weight solids aqueous dispersion of fumed alumina available commercially from Cabot Corporation of Boyertown, Pa. (the dispersion has a pH of 4.2 and a median average aggregate particle size of about 130 nm); SPECTRAL™ 81 fumed alumina, which is a fumed alumina powder available commercially from Cabot Corporation of Boyertown, Pa. (the powder has a BET surface area of 80 $m^2/g$ and a median average aggregate particle size of about 130 nm); AEROX-IDE ALU C fumed alumina, which is a fumed alumina powder available commercially from Degussa, Germany (the powder has a BET surface area of 100 $m^2/g$ and a median average primary particle size of about 13 nm); LUDOX CL-P colloidal alumina coated silica, which is a 40% by weight solids aqueous sol available from Grace Davison (the sol has a pH of 4 and an average particle size of 22 nm in diameter); NALCO 1056 aluminized silica, which is a 30% by weight solids aqueous colloidal suspension of aluminized silica particles (26% silica and 4% alumina) available commercially from Nalco; LUDOX TMA colloidal silica, which is a 34% by weight solids aqueous colloidal silica sol available from Grace Davison. (the sol has a pH of 4.7 and an average particle size of 22 nm in diameter); NALCO 88SN-126 colloidal titanium dioxide, which is a 10% by weight solids aqueous dispersion of titanium dioxide available commercially from Nalco; CAB-O-SPERSE® S3295 fumed silica, which is a 15% by weight solids aqueous dispersion of fumed silica available commercially from Cabot Corporation of Boyertown, Pa. (the dispersion has a pH of 9.5 and an average agglomerated primary particle size of about 100 nm in diameter); CAB-O-SPERSE® 2012A fumed silica, which is a 12% by weight solids aqueous dispersion of fumed silica available commercially from Cabot Corporation of Boyertown, Pa. (the dispersion has a pH of 5); CAB-O-SPERSE® PG001 fumed silica, which is a 30% by weight solids aqueous dispersion of fumed silica available commercially from Cabot Corporation of Boyertown, Pa. (the dispersion has a pH of 10.2 and a median aggregate particle size of about 180 nm in diameter); CAB-O-SPERSE® PG002 fumed silica, which is a 20% by weight solids aqueous dispersion of fumed silica available commercially from Cabot Corporation of Boyertown, Pa. (the dispersion has a pH of 9.2 and a median aggregate particle size of about 150 nm in diameter); CAB-O-SPERSE® PG022 fumed silica, which is a 20% by weight solids aqueous dispersion of fumed silica available commercially from Cabot Corporation of Boyertown, Pa. (the dispersion has a pH of 3.8 and a median aggregate particle size of about 150 nm in diameter); SIPERNAT 22LS precipitated silica, which is a precipitated silica powder available from Degussa of Germany (the powder has a BET surface area of 175 $m^2/g$ and a median average primary particle size of about 3 μm); SIPERNAT 500LS precipitated silica, which is a precipitated silica powder available from Degussa of Germany (the powder has a BET surface area of 450 $m^2/g$ and a median average primary particle size of about 4.5 μm); and VP Zirconium Oxide fumed zirconia, which is a fumed zirconia powder available from Degussa of Germany (the powder has a BET surface area of 60 $m^2/g$).

In certain possibly preferred embodiments, the particles can have a positive surface charge when suspended in an aqueous medium, such as an aqueous medium having a pH of about 4 to 8. Particles suitable for use in this embodiment include, but are not limited to, alumina-modified colloidal silica particles, alumina particles (e.g. fumed alumina particles), and combinations thereof. In certain possibly preferred embodiments, the particles can have a Mohs' hardness of about 5 or more, or about 6 or more, or about 7 or more. Particles suitable for use in this embodiment include, but are not limited to, fumed alumina particles. In certain possibly preferred embodiments, the particles can have a three-dimensional branched or chain-like structure comprising or consisting of aggregates of primary particles. Particles suitable for use in this embodiment include, but are not limited to, fumed alumina particles, fumed silica particles, and combinations thereof.

The particles included in the coating can be modified to impart or increase the hydrophobicity of the particles. For example, in those embodiments comprising fumed silica particles, the fumed silica particles can be treated, for example, with an organosilane in order to render the fumed silica particles hydrophobic. Suitable commercially-available hydrophobic particles include, but are not limited to, the R-series of AEROSIL® fumed silicas available from Degussa, such as AEROSIL® R812, AEROSIL® R816, AEROSIL® R972, and AEROSIL® R7200. While not wishing to be bound to any particular theory, it is believed that using hydrophobic particles in the coating will minimize the amount of water that the composite will absorb when exposed to a wet environment. When hydrophobic particles are utilized in the coating on the textile layer(s), the hydrophobic particles can be applied using a solvent-containing coating composition in order to assist their application.

The textile layer(s) can comprise any suitable amount of the coating. As will be understood by those of ordinary skill in the art, the amount of coating applied to the layer(s) generally should not be so high that the weight of the composite is dramatically increased, which could potentially impair certain end uses for the composite. Typically, the amount of coating applied to the textile layer(s) will comprise about 10 wt. % or less of the total weight of the textile layer. In certain possibly preferred embodiments, the amount of coating applied to the textile layer(s) will comprise about 5 wt. % or less or about 3 wt. % or less (e.g., about 2 wt. % or less) of the total weight of the textile layer. Typically, the amount of coating applied to the textile layer(s) will comprise about 0.1 wt. % or more (e.g., about 0.5 wt. % or more) of the total weight of the textile layer. In certain possibly preferred embodiments, the coating comprises about 2 to about 4 wt. % of the total weight of the textile layer.

In certain possibly preferred embodiments of the composite, the coating applied to the textile layer can further comprise a binder. The binder included in the coating can be any suitable binder. Suitable binders include, but are not limited to, isocyanate binders (e.g., blocked isocyanate binders), acrylic binders (e.g, nonionic acrylic binders), polyurethane binders (e.g., aliphatic polyurethane binders and polyether based polyurethane binders), epoxy binders, and combinations thereof. In certain possibly preferred embodiments, the binder is a cross-linking binder, such as a blocked isocyanate binder.

When present, the binder can comprise any suitable amount of the coating applied to the textile layer(s). The ratio of the amount (e.g., weight) of particles present in the coating to the amount (e.g., weight) of binder solids present in the coating typically is greater than about 1:1 (weight particles: weight binder solids). In certain possibly preferred embodiments, the ratio of the amount (e.g., weight) of particles present in the coating to the amount (e.g., weight) of binder solids present in the coating typically is greater than about 2:1, or greater than about 3:1, or greater than about 4:1, or greater than about 5:1 (e.g., greater than about 6:1, greater than about 7:1, or greater than about 8:1).

In certain possibly preferred embodiments, the coating applied to the textile layer(s) can comprise a water-repellant in order to impart greater water repellency to the composite. The water-repellant included in the coating can be any suitable water-repellant including, but not limited to, fluorochemicals or fluoropolymers.

As noted above, the composite can comprise any suitable number of textile layers (e.g., four textile layers, six textile layers, eight textile layers, twelve textile layers, sixteen textile layers, or twenty textile layers). Furthermore, any suitable number of the textile layers can have the above-described coating applied thereto. For example, each textile layer of the composite can have the coating applied to one or both of its surfaces. Alternatively, the composite can comprise an alternating series of coated and uncoated textile layers. In such an embodiment, the composite can comprise, for example, a first series of ten coated textile layers and a second series of ten uncoated textile layers disposed adjacent to the first series of textile layers. Each of these coated and uncoated textile layers can be any of the suitable textile layers described above.

The composite of the invention preferably does not exhibit any substantial change in flexibility as compared to similar, uncoated materials. In particular, the textile layers of the composite preferably exhibit the same or substantially similar flexibility as compared to similar, uncoated textile materials.

The puncture resistant composite can be produced by any suitable method or process; however, the invention also provides a process for producing the composite. In particular, the process comprises the steps of (a) providing a first textile layer and a second textile layer, (b) contacting at least one of the lower surface of the first textile layer and the upper surface of the second textile layer with a coating composition comprising a plurality of particles having a diameter of about 20 µm or less, (c) drying the textile layer treated in step (b) to produce a coating on the lower surface of the first textile layer or the upper surface of the second textile layer, and (d) assembling the first and second textile layers so that the lower surface of the first textile layer is adjacent to the upper surface of the second textile layer, thereby producing a puncture resistant composite.

The first and second textile layers suitable for use in the above-described method include, but are not limited to, those materials described above as being suitable for use in the composite. Also, the coating compositions suitable for used in the method include, but are not limited to, those compositions containing the particles and, optionally, binders described above as being suitable for use in the coating on the textile layer(s) of the composite. Typically, a coating composition suitable for use in the above-described method comprises an aqueous dispersion of the particles and, optionally, a binder.

The surface(s) of the textile layer(s) can be contacted with the coating composition in any suitable manner. The textile layers can be contacted with the coating composition using convention padding, spraying (wet or dry), foaming, printing, coating, and exhaustion techniques. For example, the textile layer(s) can be contacted with the coating composition using a padding technique in which the textile layer is immersed in the coating composition and then passed through a pair of nip rollers to remove any excess liquid. In such an embodiment, the nip rollers can be set at any suitable pressure, for example, at a pressure of about 280 kPa (40 psi). Alternatively, the surface of the textile layer to be coated can be first coated with a suitable adhesive, and then the particles can be applied to the adhesive.

The coated textile layer(s) can be dried using any suitable technique at any suitable temperature. For example, the textile layer(s) can be dried on a conventional tenter frame or range at a temperature of about 160° C. (320° F.) for approximately five minutes.

The first and second textile layers can be assembled using any suitable technique. For example, as noted above, the first and second textile layers can be stacked so that the coated surface of the first or second textile layer is adjacent to the surface of the other textile layer. In certain possibly preferred embodiments the first and second textile layers can also be sewn together in a desired pattern, for example, around the perimeter of the stacked textile layers in order to secure the layers in the proper or desired arrangement.

The puncture resistant composite of the invention and the composite produced by the above-described process are particularly well suited for use in personal protection devices, such as personal body armor. For example, as depicted in FIG. 2, the puncture resistant composite 202 can be incorporated into a vest 200 in order to provide the wearer protection against stab and, in certain embodiments, ballistic threats.

The puncture resistant composite of the invention can further comprise known ballistic resistant materials or components in addition to the above-described textile layers. An example of a known ballistic resistant material suitable for use in the composite of the invention is the ballistic resistant laminate depicted in FIG. 6. The laminate 600 comprises a first layer 610 of substantially parallel fiber bundles 612 and a second layer 620 of substantially parallel fiber bundles 622. The fibers suitable for use in the fiber bundles 612, 614 can be any of the fibers discussed above as being suitable for use in the textile layers of the composite of the invention, including any suitable combinations of such fibers. The fiber bundles 612, 614 typically are arranged in one or more tiers within the first and second layers 610, 620 and in such a manner that each of the fiber bundles 612, 614 within a layer 610, 620 is substantially parallel to the other fiber bundles 612, 614 within the same layer (e.g., the fiber bundles 612, 614 within each layer 610, 620 are unidirectionally-oriented). The fiber bundles 612, 614 within the first and second layers 610, 620 are at least partially coated with a resin 614, 624 in order to maintain the fiber bundles 612, 614 within each layer 610, 620 in their substantially parallel orientation.

The first layer 610 and the second layer 620 are stacked so that the fiber bundles 612 within the first layer 610 are oriented in a non-parallel relation relative to the fiber bundles 622 within the second layer 620. While the laminate depicted in FIG. 6 is shown with the fiber bundles 612 within the first layer 620 disposed at an angle of about 90 degrees relative to the fiber bundles 622 within the second layer 620, the fiber bundles can be disposed at any suitable angle between 0 and 180 degrees relative to each other. However, the angle between the fibers 612 within the first layer 610 and the fiber bundles 622 within the second layer 620 preferably is about 90 degrees.

The laminate 600 also comprises first and second thermoplastic films 630, 640 disposed on the outer surfaces of the first and second layers 610, 620 so that the first and second layers 610, 620 are enclosed within an envelope formed by the films 630, 640.

While the laminate 600 depicted in FIG. 6 is shown with only a first layer 610 and a second layer 620, the laminate can comprise any suitable number of layers (i.e., layers of substantially parallel fiber bundles) stacked atop each other. In such an embodiment, the fiber bundles within adjacent layers typically are disposed at any suitable angle between 0 and 180 degrees relative to each other, with 90 degrees being preferred. Typically, the layers are stacked so that the fiber bundles within a specific layer are disposed at angle of about 90 degrees relative to the fiber bundles in the layer immediately above and/or immediately below that specific layer.

Commercially-available, ballistic resistant laminates such as those described above include, but are not limited to, the SPECTRA SHIELD® high-performance ballistic materials sold by Honeywell International Inc. Such ballistic resistant laminates are believed to be more fully described in U.S. Pat. No. 4,916,000 (Li et al.); U.S. Pat. No. 5,437,905 (Park); U.S. Pat. No. 5,443,882 (Park); U.S. Pat. No. 5,443,883 (Park); and U.S. Pat. No. 5,547,536 (Park), each of which is herein incorporated by reference.

As shown in FIG. 7, a puncture resistant composite 700 according to the invention can comprise a ballistic resistant laminate 600 in combination with the textile layers 102, 108, 114, as described above. The laminate is disposed adjacent to the upper or lower surface of one of the textile layers. The laminate can be attached to the adjacent textile layer using any suitable means, such as an adhesive, stitches, or other suitable mechanical fasteners, or the laminate and textile layers can be disposed adjacent to each other and held in place relative to each other by a suitable enclosure, such as a pocket in a piece of body armor which is adapted to carry a ballistic resistant insert.

A puncture resistant composite according to the invention can further comprise other puncture resistant materials or components. Examples of suitable known puncture resistant materials or components include, but are not limited to, mail (e.g., chain mail), metal plating, ceramic plating, or layers of textile materials made from high tenacity yarns which layers have been impregnated or laminated with an adhesive or resin. Such puncture resistant materials or components can be attached to the adjacent textile layer using any suitable means, such as an adhesive, stitches, or other suitable mechanical fasteners, or the material or component and textile layers can be disposed adjacent to each other and held in place relative to each other by a suitable enclosure, such as a pocket in a piece of body armor which is adapted to carry a ballistic resistant insert.

A puncture resistant composite according to the invention can further comprise one or more layers of suitable backing material, such as a textile material (e.g., a textile material made from any suitable natural or synthetic fiber), foam, or one or more plastic sheets (e.g., polycarbonate sheets). For example, the backing material can comprise a plurality of layers of woven or knit polyester textile material which are positioned adjacent to the upper or lower surface of the above-described textile layers. The backing material can also be a trauma pack (e.g., one or more polycarbonate sheets), such as those typically used in body armor.

The following examples further illustrate the invention but, of course, should not be construed as in any way limiting its scope.

The samples in the Examples set forth below were treated using a "padding" process, wherein a liquid coating is applied to a textile substrate by passing the substrate through a bath and subsequently through squeeze rollers. In particular, a piece of fabric measuring approximately 13 inches (33 cm)× 17 inches (43 cm) was immersed in a bath containing the chemical composition containing the desired chemical agents. Unless otherwise stated, all chemical percents (%) are percent by weight based on the total weight of the bath prepared and the balance remaining, when chemical percents or grams of chemical are given, is comprised of water. In addition, the percent chemical was based on the chemical as received from the manufacturer, such that if the composition contained 30% active component, then X % of this 30% composition was used.

After the fabric was completely wet by immersion in the bath, the fabric was removed from the treatment bath and passed between nip rolls (squeeze rolls) at a pressure of about 40 psi (280 kPa) to obtain a uniform pickup generally between about 30% and about 100%, based on the weight of the fabric. The fabric was then pulled taut and pinned to a frame to retain the desired dimensions. The pin frame was placed into a Despatch oven at a temperature of between about 300° F. (150° C.) and about 320° F. (160° C.) for between about 5 and about 8 minutes to dry and to cure the finish. Once removed from the oven, the fabric was removed from the pin frame and allowed to equilibrate at room temperature for at least 24 hours prior to testing.

Two types of KEVKAR® fabric were used in the Examples set forth below. One was a woven KEVLAR® KM-2 fabric obtained from Hexcel Corporation of Arlington, Tex. The fabric was comprised of KEVLAR® KM-2 850 denier warp and fill yarns woven together in a plain weave construction with 31.5 ends/inch (12.4 ends/cm) and 31 picks/inch (12.2 picks/cm). The fabric weight was approximately 6.8 oz/yd$^2$ (160 g/m$^2$). The other fabric was a woven KEVLAR® fabric from an actual ballistic vest (from Safariland of Ontario, Calif.). The vest consists of 10 layers of film backed laid-scrim type non-woven fabric and 17 layers of woven KEVLAR® fabric with 750 denier yarns in a 31 ends/inch (12.2 ends/cm) by 31 picks/inch (12.2 picks/cm) plain weave construction. The fabric weight of the woven fabric was approximately 6.2 oz/yd$^2$ (150 g/m$^2$). The vest was rated NIJ Threat Level III-A.

A dynamic spike stab test was performed on the samples according to NIJ Standard-0115.00, entitled "Stab Resistance of Personal Body Armor" (September 2000). In this test, multiple layers of test fabric are placed on a slab of backing materials specified by the NIJ Standard. The backing materials were obtained from BCF Foam Corporation of Hamilton, Ohio. The backing materials consisted of four layers of 5.8 mm-thick neoprene sponge, followed by one layer of 31-mm-thick polyethylene foam, and two 6.4-mm-thick layers of rubber. The NIJ specified spike, which was obtained from Precision Machine Works, Inc. of Culpeper, Va., was used as the threat weapon. The spike was affixed to a NIJ specified drop mass and dropped from a predetermined height inside a guided rail drop tube at 0° angle of incidence. The impact energy can be varied by varying the drop speed. The depth of penetration is then measured.

The quasi-static puncture test was performed using a MTS Sintech 10/G tensile tester with a 562 lbs (255 kg) load cell used in the compression mode. The compression speed is set at 1 inch/minute (2.5 cm/minute). In the quasi-static puncture test, the same backing materials and spike specified for the dynamic spike stab test were used. The spike is reinforced by a metal sleeve to prevent it from bending. In this test, a predetermined number of layers (typically 1, 2, 4, and 6 layers) of test fabric were placed on the slab of backing materials and the spike is lowered into the fabric at 1 inch/minute (2.5 cm/minute). The load and the compression distance are recorded. At least three independent measurements are performed for each test configuration. The peak load (the force (in pounds) that is required to fully penetrate the test sample) for each test configuration is then obtained.

EXAMPLE 1

Four samples (Samples 1A-1D) were produced by coating the woven KEVLAR® KM-2 fabrics described above. Sample 1A was prepared by coating the fabric in a bath comprising approximately 100 grams (or 10%) of CAB-O-SPERSE® PG003, a fumed alumina dispersion (40% solids) with 150 nm particle size available from Cabot Corporation, and approximately 900 grams of water. Sample 1B was prepared by coating the fabric in a bath comprising approximately 100 grams (or 10%) of CAB-O-SPERSE® PG003, 10 grams (or 1%) MILLITEX™ Resin MRX, a blocked isocyanate based cross-linking agent (with 3545% solids) available from Milliken Chemical, and 890 grams of water. Sample 1C was prepared by coating the fabric in a bath comprising approximately 100 grams (or 10%) of CAB-O-SPERSE® PG003, 20 grams (or 2%) MILLITEX™ Resin MRX, and 880 grams of water. Sample 1D was prepared by coating the fabric in a bath comprising approximately 100 grams (or 10%) of CAB-O-SPERSE® PG003, 100 grams (or 10%) MILLITEX™ Resin MRX, and 800 grams of water.

The treated KEVLAR® fabrics and the non-treated control KEVLAR® fabric were tested for quasi-static spike puncture resistance according to the procedures described above. The quasi-static test results are shown in FIG. 3. The treated KEVLAR® fabrics in Example 1B and the control fabrics were also tested for dynamic spike stab resistant according to NIJ Standard-0115.00. While 10 layers of the control fabric showed full penetration (>70 mm), 10 layers of treated KEVLAR® fabric (Example 1B) showed no visible signs of penetration and bent the spike at 32 Joules of strike energy.

EXAMPLE 2

Two samples (Samples 2A and 2B) were produced by coating woven KEVLAR® KM-2 fabrics as described above. Sample 2A was prepared by coating the fabric in a bath comprising approximately 100 grams (or 10%) of LUDOX CL-P, a colloidal alumina-coated silica sol (40% solids) with 22 nm particle size available from Grace Davison, and approximately 900 grams of water. Sample 2B was prepared by coating the fabric in a bath comprising approximately 120 grams (or 12%) of LUDOX TMA, a colloidal silica sol (34% solids) with 22 nm particle size available from Grace Davison, and approximately 880 grams of water.

The treated KEVLAR® fabrics and the non-treated control KEVLAR® fabric were tested for quasi-static spike puncture resistance according to the procedures described above. The test results are shown in FIG. 4.

EXAMPLE 3

Three samples (Samples 3A-3C) were produced by coating the woven KEVLAR® KM-2 fabrics described above. Sample 3A was prepared by coating the fabric in a bath comprising approximately 100 grams (or 10%) of CAB-O-SPERSE® PG003, approximately 10 grams (or 1%) WITCOBOND W293, a polyurethane based binder (66-69% solids) available from Crompton Corp., and approximately 890 grams of water. Sample 3B was prepared by coating the fabric in a bath comprising approximately 100 grams (or 10%) of CAB-O-SPERSE® PG003, approximately 10 grams (or 1%) PRINTRITE 595, a nonionic acrylic emulsion (45% solids) available from Noveon, and approximately 890 grams of water. Sample 3C was prepared by coating the fabric in a bath comprising approximately 100 grams (or 10%) of CAB-O-SPERSE® PG003, approximately 10 grams (or 1%) SANCURE 898, a polyether based polyurethane dispersion (32% solids) available from Noveon, and approximately 890 grams of water.

The treated KEVLAR® fabrics were tested for quasi-static spike puncture resistance according to the procedures described above. The test results are shown in Table 1.

TABLE 1

Results of quasi-static spike puncture test for Samples 1B, 3A-C, and Control.

| Number of layers | Peak Load (in lbs) | | | | |
|---|---|---|---|---|---|
| | Sample 1B | Sample 3A | Sample 3B | Sample 3C | Control |
| 1 | 9.27 | 7.83 | 8.50 | 8.18 | 5.33 |
| 2 | 15.37 | 13.70 | 13.21 | 13.51 | 5.56 |
| 4 | 62.34 | 32.48 | 45.49 | 50.47 | 7.01 |
| 6 | 203.23 | 181.57 | 216.82 | 198.19 | 8.68 |

EXAMPLE 4

Two samples (Samples 4A and 4B) were produced by coating woven KEVLAR® KM-2 fabrics as described above. Sample 4A was prepared by coating the fabric in a bath comprising approximately 100 grams (or 10%) of CAB-O-SPERSE® PG008, a fumed alumina dispersion (40% solids) with 130 nm particle size available from Cabot Corporation, approximately 10 grams (or 1%) MILLITEX™ Resin MRX, and approximately 890 grams of water. Sample 4B was prepared by coating the fabric in a bath comprising approximately 40 grams (or 4%) of AEROXIDE ALU C, a fumed alumina powder with 13 nm primary particle size available from Degussa, approximately 10 grams (or 1%) MILLITEX™ Resin MRX, and approximately 950 grams of water.

The treated KEVLAR® fabrics were tested for quasi-static spike puncture resistance according to the procedures described above. The test results are shown in Table 2.

TABLE 2

Results of quasi-static spike puncture test for Samples 1B, 4A, 4B, and Control.

| Number of layers | Peak Load (in lbs) | | | |
|---|---|---|---|---|
| | Sample 1B | Sample 4A | Sample 4B | Control |
| 1 | 9.27 | 8.22 | 8.34 | 5.33 |
| 2 | 15.37 | 12.82 | 12.74 | 5.56 |
| 4 | 62.34 | 32.12 | 27.96 | 7.01 |
| 6 | 203.23 | 146.60 | 140.56 | 8.68 |

EXAMPLE 5

Sample 5 was prepared in the same manner as Sample 1B above, except that the KEVLAR® KM-2 fabric was replaced with the woven KEVLAR® fabric from an actual ballistic vest as described above. The woven fabrics from the vest were removed from the vest, and individual pieces of fabric were treated as in Example 1B.

The treated woven vest KEVLAR® fabrics and the non-treated control woven vest KEVLAR® fabrics were tested for quasi-static spike puncture resistance according to the procedures described above. The quasi-static test results are shown in Table 3.

TABLE 3

Results of quasi-static spike puncture test for Sample 5 and Control.

| | Peak Load (in lbs) | |
|---|---|---|
| Number of layers | Sample 5 | Control |
| 1 | 8.34 | 4.15 |
| 2 | 12.74 | 4.29 |
| 4 | 27.96 | 4.30 |
| 6 | 140.56 | 4.56 |

The treated vest KEVLAR® and the control fabrics were also tested for dynamic spike stab resistant according to NIJ Standard-0115.00. While 10 layers of the control fabric showed full penetration (>70 mm), 8 layers of treated vest KEVLAR® fabric showed no visible signs of penetration and bent the spike at 33 Joules of spike energy, and 10 layers of treated vest KEVLAR® fabric showed no visible signs of penetration and bent the spike at 60 Joules of strike energy.

The treated vest KEVLAR® fabrics were reassembled into the original vest configuration (without sewing) and tested for ballistic resistance at Level III-A according to NIJ Standard 0101.04 (2000). Within the experimental error, no significant difference in performance was observed between the treated vest and the control vest (without sewing). Both vests passed the Level III-A test.

EXAMPLE 6

Four samples (Samples 6A-6D) were produced by coating the woven KEVLAR® KM-2 fabrics described above. Sample 6A was prepared by coating the fabric in a bath comprising approximately 333 grams (or 33.3%) of CAB-O-SPERSE® 2012A, a fumed silica dispersion (12% solids) available from Cabot Corporation, and approximately 667 grams of water. Sample 6B was prepared by coating the fabric in a bath comprising approximately 333 grams (or 33.3%) of CAB-O-SPERSE® 2012A, approximately 10 grams (or 1%) MILLITEX™ Resin MRX, and approximately 657 grams of water. Sample 6C was prepared by coating the fabric in a bath comprising approximately 200 grams (or 20%) of CAB-O-SPERSE® PG022, a fumed silica dispersion (20% solids) available from Cabot Corporation, and approximately 800 grams of water. Sample 6D was prepared by coating the fabric in a bath comprising approximately 200 grams (or 20%) of CAB-O-SPERSE® PG022, approximately 10 grams (or 1%) MILLITEX™ Resin MRX, and approximately 790 grams of water.

The treated KEVLAR® fabrics were tested for quasi-static spike puncture resistance according to the procedures described above. The tests results are shown in Table 4.

TABLE 4

Results of quasi-static spike puncture test for Samples 6A-D, and Control.

| | Peak Load (in lbs) | | | | |
|---|---|---|---|---|---|
| Number of layers | Sample 6A | Sample 6B | Sample 6C | Sample 6D | Control |
| 1 | 9.21 | 9.30 | 11.06 | 9.27 | 5.33 |
| 2 | 17.10 | 17.17 | 21.04 | 17.96 | 5.56 |
| 4 | 147.99 | 77.75 | 140.36 | 133.21 | 7.01 |
| 6 | 271.65 | 258.08 | 269.76 | 236.72 | 8.68 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A puncture resistant composite comprising:
   (a) a first textile layer comprising a plurality of yarns or fibers having a tenacity of about 8 or more grams per denier, the first textile layer having an upper surface and a lower surface,
   (b) a second textile layer comprising a plurality of yarns or fibers having a tenacity of about 8 or more grams per denier, the second textile layer having an upper surface and a lower surface, the upper surface of the second textile layer being adjacent to the lower surface of the first textile layer, wherein at least one of the lower surface of the first textile layer and the upper surface of the second textile layer comprises about 10 wt. % or less, based on the total weight of the textile layer, of a coating comprising a plurality of particles having a diameter of about 20 μm or less.

2. The puncture resistant composite of claim 1, wherein the particles are selected from the group consisting of silica, alumina, silicon carbide, titanium carbide, tungsten carbide, titanium nitride, silicon nitride, and combinations thereof.

3. The puncture resistant composite of claim 2, wherein the particles are selected from the group consisting of fumed alumina and fumed silica.

4. The puncture resistant composite of claim 3, wherein the particles comprise fumed alumina.

5. The puncture resistant composite of claim 1, wherein the particles have a diameter of about 300 nm or less.

6. The puncture resistant composite of claim 1, wherein the coating further comprises a binder.

7. The puncture resistant composite of claim 6, wherein the binder comprises about 5 to about 15 wt. % of the coating.

8. The puncture resistant composite of claim 1, wherein the yarns or fibers of the first and second textile layers comprise fibers selected from the group consisting of gel-spun ultrahigh molecular weight polyethylene fibers, melt-spun polyethylene fibers, melt-spun nylon fibers, melt-spun polyester fibers, sintered polyethylene fibers, aramid fibers, PBO fibers, PBZT fibers, PIPD fibers, poly(6-hydroxy-2-napthoic acid-co-4-hydroxybenzoic acid) fibers, carbon fibers, and combinations thereof.

9. The puncture resistant composite of claim 8, wherein the yarns or fibers comprise aramid fibers.

10. The puncture resistant composite of claim 9, wherein the yarns or fibers comprise poly-p-phenyleneterephthalamide fibers.

11. The puncture resistant composite of claim 1, wherein the yarns or fibers have a tenacity of about 14 or more grams per denier.

12. The puncture resistant composite of claim 1, wherein the first and second textile layers are woven fabrics comprising a plurality of yarns.

13. The puncture resistant composite of claim 1, wherein the yarns or fibers have a diameter of about 100 to about 1500 denier.

14. The puncture resistant composite of claim 1, wherein the first and second textile layers have a weight of about 4 to about 10 ounces per square yard.

15. The puncture resistant composite of claim 1, wherein the coating comprises about 5 wt. % or less of the total weight of the first or second textile layer.

16. The puncture resistant composite of claim 1, wherein the composite comprises a third textile layer comprising a plurality of yarns or fibers having a tenacity of about 8 or more grams per denier, the third textile layer having an upper surface and a lower surface, the upper surface of the third textile layer being adjacent to the lower surface of the second textile layer, wherein at least one of the lower surface of the second textile layer and the upper surface of the third textile layer comprises about 5 wt. % or less, based on the total weight of the textile layer, of the coating.

17. A process for producing a puncture resistant composite, the process comprising the steps of:
(a) providing a first textile layer and a second textile layer, the first and second textile layers each comprising a plurality of yarns or fibers having a tenacity of about 8 or more grams per denier, and the first and second textile layers each having an upper surface and a lower surface,
(b) contacting at least one of the lower surface of the first textile layer and the upper surface of the second textile layer with a coating composition comprising a plurality of particles having a diameter of about 20 μm or less and,
(c) drying the textile layer treated in step (b) to produce a coating on the lower surface of the first textile layer or the upper surface of the second textile layer, and
(d) assembling the first and second textile layers so that the lower surface of the first textile layer is adjacent to the upper surface of the second textile layer, thereby producing a puncture resistant composite.

18. The process of claim 17, wherein the coating comprises about 10 wt. % or less of the total weight of the first or second textile layer.

19. The process of claim 17, wherein the particles comprise fumed alumina.

20. The process of claim 17, wherein the yarns or fibers of the first and second textile layers comprise fibers selected from the group consisting of gel-spun ultrahigh molecular weight polyethylene fibers, melt-spun polyethylene fibers, melt-spun nylon fibers, melt-spun polyester fibers, sintered polyethylene fibers, aramid fibers, PBO fibers, PBZT fibers, PIPD fibers, poly(6-hydroxy-2-napthoic acid-co-4-hydroxybenzoic acid) fibers, carbon fibers, and combinations thereof.

* * * * *